US008366181B2

(12) United States Patent
Belpaire et al.

(10) Patent No.: US 8,366,181 B2
(45) Date of Patent: Feb. 5, 2013

(54) STRUCTURAL REINFORCER APPLIED TO CUT-OUT AREA OF STRUCTURAL MEMBER

(75) Inventors: Vincent Belpaire, Uccle (BE);
Sebastien Delneufcourt, Namur (BE);
Francois Godillon, Valenciennes (FR);
Gaetan Lison, Berchem-St-Agathe (BE)

(73) Assignee: Sika Technology AG, Baar (CH)

( * ) Notice: Subject to any disclaimer, the term of this patent is extended or adjusted under 35 U.S.C. 154(b) by 85 days.

(21) Appl. No.: 12/872,788

(22) Filed: Aug. 31, 2010

(65) Prior Publication Data
US 2011/0057481 A1 Mar. 10, 2011

(30) Foreign Application Priority Data

Aug. 31, 2009 (EP) .................................. 09169022

(51) Int. Cl.
*B62D 21/00* (2006.01)
*B62D 27/00* (2006.01)
(52) U.S. Cl. ................. 296/187.01; 296/29; 296/193.01
(58) Field of Classification Search ........... 296/29, 296/30, 187.01, 187.02, 187.08, 203.01, 296/204, 209, 205, 193.01
See application file for complete search history.

(56) References Cited

U.S. PATENT DOCUMENTS

| 5,631,027 | A | | 5/1997 | Takabatake | |
|---|---|---|---|---|---|
| 5,992,921 | A | * | 11/1999 | Seki | .......................... 296/187.09 |
| 6,058,673 | A | | 5/2000 | Wycech | |
| 2008/0143143 | A1 | * | 6/2008 | Brennecke | ............... 296/187.01 |

FOREIGN PATENT DOCUMENTS

| DE | 3838655 A1 | 5/1990 |
|---|---|---|
| EP | 1731284 A2 | 12/2006 |
| WO | WO-01/58741 A1 | 8/2001 |
| WO | WO-03/089221 A1 | 10/2003 |

OTHER PUBLICATIONS

European Search Report for EP09169002.

* cited by examiner

*Primary Examiner* — Glenn Dayoan
*Assistant Examiner* — Jason S Daniels
(74) *Attorney, Agent, or Firm* — Rader, Fishman & Grauer PLLC

(57) ABSTRACT

A structural member assembly includes a substantially hollow structural member and a structural reinforcer. The hollow structural member is formed by a plurality of panels. At least one of the panels includes a cut-out region extending from the edge of the panel to the interior of the panel so that the cut-out region is not fully enclosed by the panel. The structural reinforcer includes a rigid carrier and a bonding material. The structural reinforcer is installed in the interior of the structural member across said cut-out region.

8 Claims, 3 Drawing Sheets

STRUCTURAL REINFORCER APPLIED TO CUT-OUT AREA OF STRUCTURAL MEMBER

CROSS-REFERENCE TO RELATED APPLICATION

This application claims priority to a European patent application No. 09169022.2 filed on Aug. 31, 2010, which is hereby incorporated by reference in its entirety.

BACKGROUND

Structural reinforcers are used in various industries to provide structural support to or reduce noise and/or vibrations in various products. For example, in the automotive industry, a reinforcer may be used to reinforce a variety of substantially enclosed, elongated structural members, such as beams, pillars, rails, nodes, doors, or roof of the vehicle. Known reinforcers commonly include a rigid carrier member and a structural foam or structural adhesive (collectively herein, "bonding materials") disposed at select locations on the outer surface of the carrier. The carrier is sometimes made from metal, plastic, glass filled or hybrid metal plastic, or hybrid plastic fiber mat, plastic. The bonding material is commonly in an unactivated state when the reinforcer is manufactured, but configured to be activated and, in some cases, expand in response to an activator, such as heat. The structural reinforcer is configured to be installed inside of a hollow area of a structural member. When the bonding material is activated, it creates a bond between the carrier and the interior walls of the structural member. In the automobile context, the activating heat is commonly provided when the vehicle is processed through the paint booth.

The structural members into which reinforcers have commonly been installed are normally comprised of sheet metal panels that together form a substantially enclosed, elongated hollow member. It has been known to sometimes create various holes in the sheet metal panels to enable the passing of tools or parts therethrough during the manufacturing process. However, because the holes are surrounded on all sides by the remaining sheet metal, the integrity of the structural member is not substantially compromised by the addition of holes. More recently, it has become desirable to sometimes include a cut-out from one of the sheet metal panels of the structural member for ease of manufacturing purposes. A "cut-out", as opposed to a hole, extends from one edge of the sheet metal to the interior of the sheet metal in a direction that is substantially orthogonal to the longitudinal axis of the structural member. Including these types of "cut-outs" in a structural member may compromise its structural integrity more than a simple hole. To date, these potential compromises in structural integrity have been addressed by increasing the thickness or the quality of the sheet metal that forms the structural member. However, that solution can substantially increase the cost and weight of the structural member.

Therefore, the inventors hereof have developed a desirable configuration for a structural member having a cut-out area that improves the structural integrity of the structural member while minimizing the increase in cost and weight of the part.

SUMMARY

A structural member having a cut-out portion that is reinforced by a structural reinforcer is disclosed. The structural member is a substantially enclosed, hollow member formed by the assembly of panels or sheets. At least one of the panels includes a cut-out portion that is substantially orthogonal to the longitudinal axis of the structural member. A structural reinforcer, having a rigid carrier and a bonding material, is installed on the interior of the structural member across the cut-out area to improve the structural integrity of the structural member at the location of the cut-out portion.

BRIEF DESCRIPTION OF THE DRAWINGS

The foregoing description will be understood more completely from the following detailed description of the exemplary drawings, in which.

DETAILED DESCRIPTION

An improved configuration for a structural member having a cut-out region is disclosed. The structural member is a substantially enclosed, elongated hollow member formed by the assembly of panels or sheets that may be made from metal or another material (collectively, "panels"). At least one of the sheets includes a cut-out portion that is substantially orthogonal to the longitudinal axis of the structural member. A structural reinforcer is installed in the interior of the structural member across the cut-out to improve the structural integrity of the structural member at the point of the cut-out region.

The reinforcer includes a rigid carrier and a structural foam or adhesive (collectively herein, "bonding material") disposed at selected locations on the outer surface of the carrier member. The carrier is sometimes made from metal, plastic, glass filled or hybrid metal plastic, or hybrid plastic fiber mat, plastic. The bonding material may be activated by a stimulus, such as heat, at which time the bonding material is configured to bond the carrier to the interior panel of the structural member on opposite sides of the cut-out region.

Figure 1:
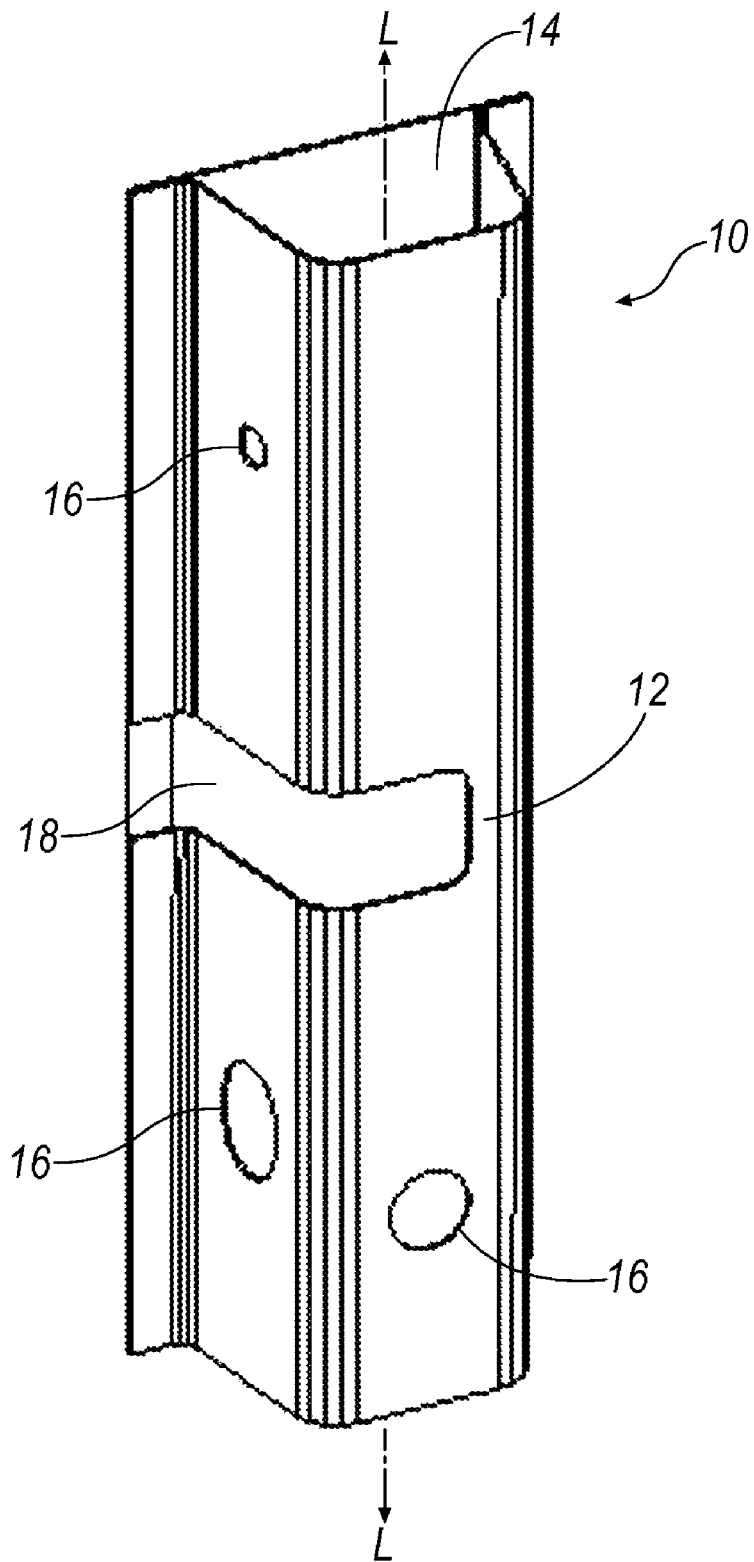
FIG. 1 is an exemplary substantially enclosed, elongated hollow structural member, including exemplary holes and an exemplary cut-out region.

FIG. 1 illustrates an exemplary substantially-enclosed, hollow structural member 10. The structural member 10 is constructed from two exemplary panels 12 and 14. The structural member 10 may be constructed from more than two panels. The structural member 10 has a longitudinal axis L. Structural member 10 may include holes 16 for various reasons. As noted, such holes 16 do not substantially compromise the structural integrity of the member 10. Structural member 10 also includes a cut-out region 18. The cut-out region 18 is shown in FIG. 1 as a substantially rectangular area, but it can be of virtually any shape. It is this cut-out region 18 that, according to an embodiment of the invention, is reinforced by the use of a structural reinforcer.

Figure 2:
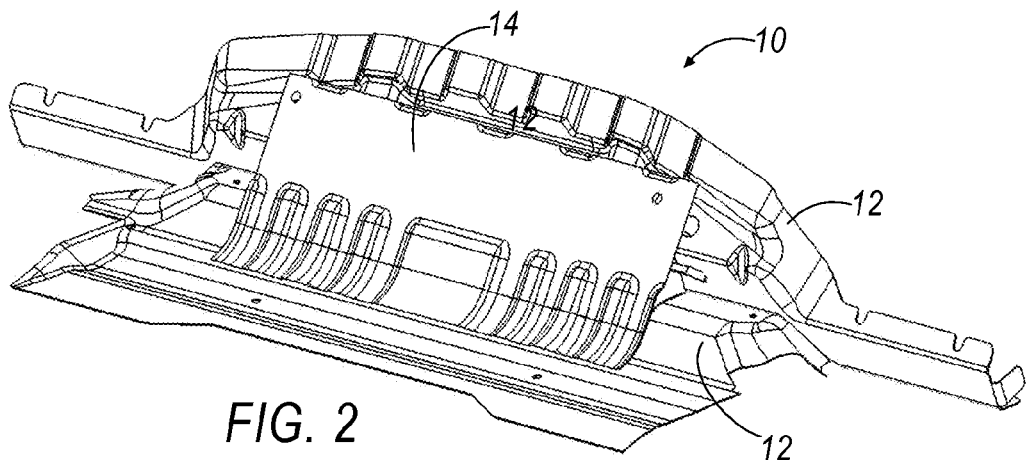
FIG. 2 a perspective view of an exemplary structural member according to one embodiment of the invention.
Figure 3:
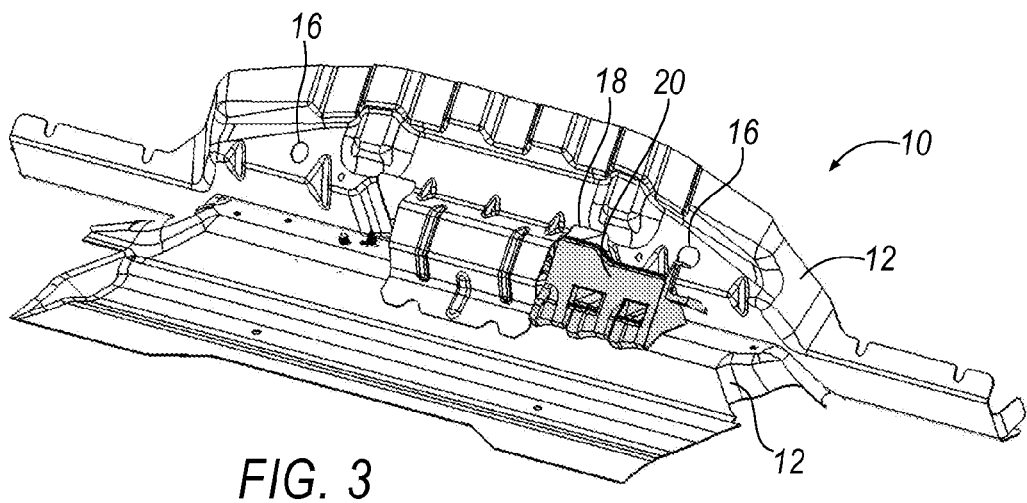
FIG. 3 is the exemplary structural member of FIG. 2, with one of the sheets removed to disclose the interior of the hollow structural member, which includes a structural reinforcer.

FIG. 2 illustrates a perspective view of another exemplary structural member 10. Again, structural member 10 is formed from two panels 12 and 14. FIG. 3 illustrates the same structural member as in FIG. 2, from the same viewpoint, except that the bottom panel 14 has been removed to disclose the hollow interior of the structural member 10. Structural member 10 includes a cut-out region 18. Structural reinforcer 20 is installed in the interior of structural member 10 across the cut-out region 18 so that opposite edges of the cut-out region are, upon activation of the bonding material, bonded to the structural reinforcer 20.

Figure 4:
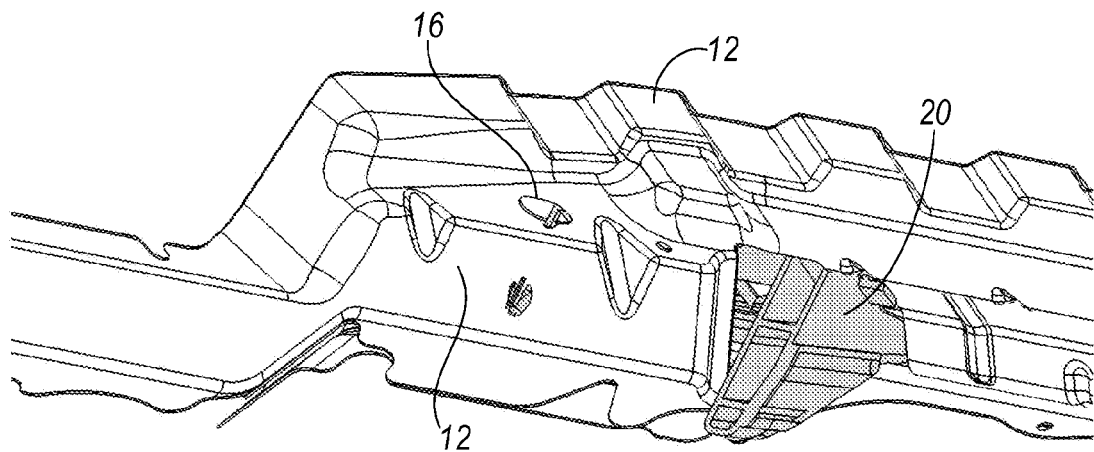
FIG. 4 is a second perspective view of the exemplary structural member of FIG. 2.

FIG. 4 is a perspective view of the structural member 10 of FIGS. 2 and 3 from the opposite side. Here, the cut-out region 18 and the structural reinforcer 20 installed across the cut-out region are visible from the exterior view of the structural member 10.

Figure 5:
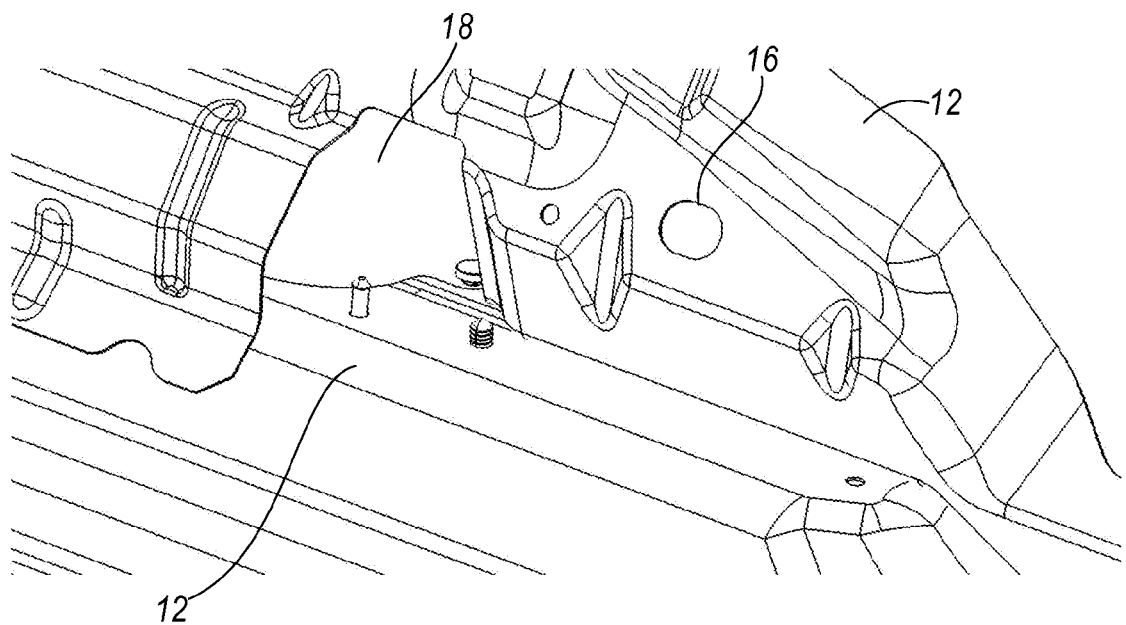
FIG. 5 is a close-up perspective view of the structural member of FIG. 2, showing the cut-out region without the structural reinforcer in place.

FIG. 5 is a close up perspective view of the structural member of FIGS. 2-4, but with the structural reinforcer 20 removed so that the cut-out region 18 is clearly visible.

Figure 6:
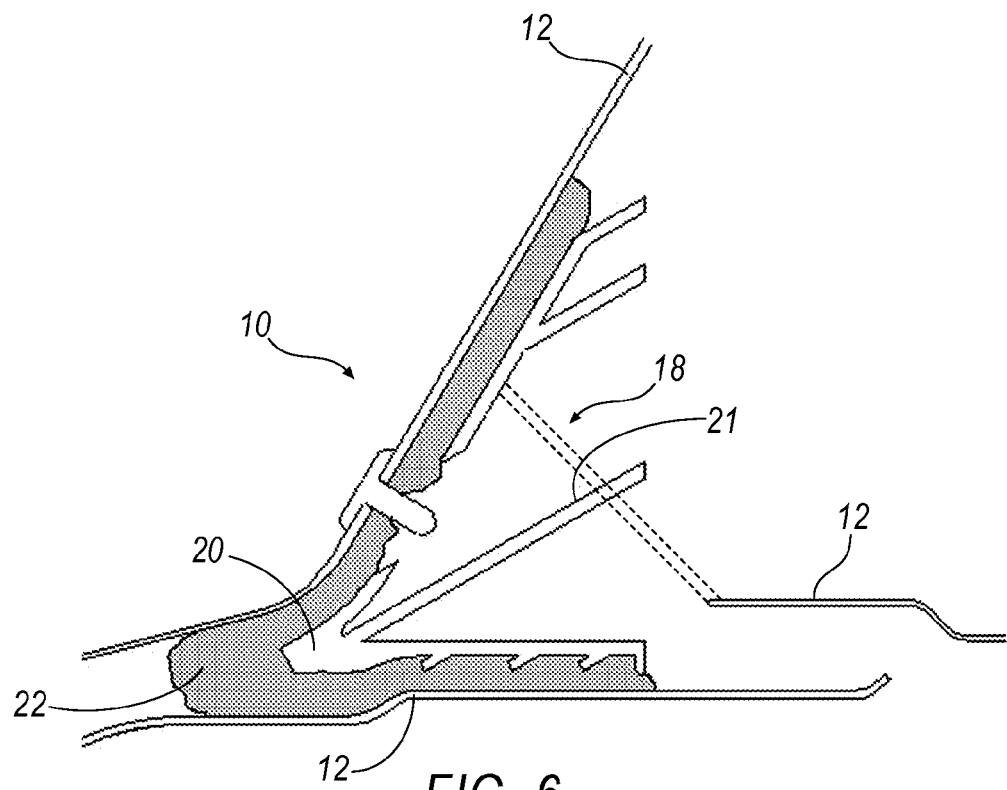
FIG. 6 is a cross-sectional view of the structural member of FIG. 2 and the structural reinforcer disposed therein.

FIG. 6 is a cross-sectional view of the structural member 10 of FIGS. 2-5. As in those figures, structural member 10 includes cut-out region 18 in panel 12. Structural reinforcer 20 is installed in the interior of structural member 10 across cut-out region 18. In this cross-sectional view, the constituents of the structural reinforcer 20, i.e., carrier 21 and bonding material 22, are visible. The reinforcer 20 extends across cut-out region 18 to bond opposite edges of the cut-out region 18 of the panel 12.

The above description is intended to be illustrative and not restrictive. Many alternative approaches or applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future examples. In sum, it should be understood that the invention is capable of modification and variation and is limited only by the following claims.

The present embodiments have been particularly shown and described, which are merely illustrative of the best modes. It should be understood by those skilled in the art that various alternatives to the embodiments described herein may be employed in practicing the claims without departing from the spirit and scope as defined in the following claims. It is intended that the following claims define the scope of the invention and that the method and apparatus within the scope of these claims and their equivalents be covered thereby. This description should be understood to include all novel and non-obvious combinations of elements described herein, and claims may be presented in this or a later application to any novel and non-obvious combination of these elements. Moreover, the foregoing embodiments are illustrative, and no single feature or element is essential to all possible combinations that may be claimed in this or a later application.

All terms used in the claims are intended to be given their broadest reasonable constructions and their ordinary meanings as understood by those skilled in the art unless an explicit indication to the contrary is made herein. In particular, use of the singular articles such as "a," "the," "said," etc. should be read to recite one or more of the indicated elements unless a claim recites an explicit limitation to the contrary.

We claim:

1. A structural member assembly, comprising:
   a substantially hollow structural member comprised of a plurality of panels;
   at least a first one of said panels defining a cut-out region, where the cut-out region extends from the edge of said first panel to the interior of said first panel so that said cut-out region is not fully enclosed by said first panel;
   a structural reinforcer, including a rigid carrier and a bonding material, installed in the interior of the structural member across said cut-out region; and
   a second panel assembled to said first panel, thereby creating the hollow structural member with said structural reinforcer being in the interior thereof.

2. The structural member assembly of claim 1, wherein said bonding material of said reinforcer, upon activation, bonds to opposite sides of said first panel defining said cut-out region.

3. The structural member assembly of claim 1, wherein said structural member assembly is configured to be installed in an automotive vehicle.

4. The structural member assembly of claim 1, wherein said bonding material is chosen from the group consisting of a structural foam and a structural adhesive.

5. The structural member assembly of claim 1, wherein said bonding material is heat-activated.

6. The structural member assembly of claim 1, wherein said structural member is elongated with a longitudinal axis and wherein said cut-out region is substantially orthogonal to the longitudinal axis of the structural member.

7. A method of reinforcing a structural member, comprising:
   providing a first panel having at least one cut-out region, where the cut-out region extends from the edge of said panel to the interior of said panel so that said cut-out region is not fully enclosed by said panel;
   installing a structural reinforcer, including a rigid carrier and an unactivated bonding material, across said cut-out region of said first panel; and
   assembling a second panel to said first panel to create a substantially hollow structural member with said structural reinforcer in the interior thereof.

8. The method of claim 7, further comprising the step of activating said bonding material to cause it to bond said reinforcer to said first panel at opposite sides of said cut-out region.

\* \* \* \* \*